3,238,261
PIPERITENONE PROCESS

John J. Beereboom, Waterford, Conn., assignor to Chas. Pfizer & Co., Inc., Brooklyn, N.Y., a corporation of Delaware
No Drawing. Filed June 17, 1963, Ser. No. 288,515
6 Claims. (Cl. 260—587)

This invention relates to the preparation of piperitenone and, more particularly, to an improved process for the production of piperitenone from mesityl oxide and methyl vinyl ketone.

Piperitenone, a naturally occurring diethylenic monoterpenoid ketone, also known as 4-isopropylidene-1-methyl-1-cyclohexen-3-one or p-mentha-1,4(8)-dien-3-one, is of value as an intermediate for the production of menthol and its isomers. Its synthesis, in 41% yield, was first reported by Bergmann et al. (J. Org. Chem., 24, 994, 1959) by the Michael condensation of mesityl oxide and methyl vinyl ketone in toluene solution in the presence of sodium t-pent-oxide. The chemical reactions of the compound obtained were said to be identical with those of natural piperitenone although differences in the ultraviolet spectrum were reported. Shortly thereafter Naves (Bull. soc. chim. 378, 1960) reported the compound described by Bergmann et al. to be an isoxylitone. Ueda (Bull. Agr. Chem. Soc., Japan, 24, 601, 1960) repeated the reaction of Bergmann et al. and on subsequent reduction of the product obtained a small yield of d,1-menthol. Naves, in a further study of the reaction (Compt. rend., 251, 1130, 1960) identified three products including piperitenone in less than 8% yield. Bergman et al. (J. Org. Chem., 26, 4685, 1961) repeated their earlier work in view of these findings and observed that piperitenone and isoxylitone are both formed. Great difficulty was encountered in the separation of these two products even with an efficient distillation column. In my hands, repetition of the Bergmann synthesis produced a mixture of four compounds from which piperitenone, present in low yields, could be isolated only by gas chromatography.

In a more recent study of this condensation by Wiemann et al. (Compt. rendus, 253, 1109, 1962), the effects of different catalysts, barium oxide, magnesium washed with ammonia and quicklime were determined. Barium oxide, the most effective of the catalysts studied produced only 15% piperitenone. The same authors report (Bull. soc. chim., 1813, 1962) that the mixture of condensation products obtained was difficult to separate. Additionally, difficulty was encountered in obtaining reproducible results.

The difficulties encountered by the previous investigators are not surprising, nor unexpected, in view of the known reactivity of mesityl oxide and methyl vinyl ketone, particularly under the base-catalyzed reaction conditions required for the condensation to proceed. The condensation involves a Michael addition between mesityl oxide and methyl vinyl ketone followed by an aldol cyclization that must proceed in a given direction if piperitenone is to result when two aldol reactions are equally probable. Further, methyl vinyl ketone readily undergoes anionic polymerization in the presence of a base and mesityl oxide can enter into a Michael-aldol reaction sequence with itself. Finally, two moles of methyl vinyl ketone can react with mesityl oxide to produce a completely undesirable product.

Despite the multiplicity of reactions possible with mesityl oxide and methyl vinyl ketone in the presence of a basic catalyst, reaction conditions have now been found which minimize the extent of side-reactions, and hence of by-products, and permit the formation of piperitenone in yields of 50% and higher. The reaction conditions, as might be expected from the above remarks on the reactivity of the components, are rather critical if optimum yields of piperitenone are to be realized. The conditions are readily adaptable to large scale manufacturing equipment and, since the formation of closely boiling by-products is minimized, the isolation and purification of piperitenone is conveniently accomplished as described below.

The improved process of the present invention involves the condensation of methyl vinyl ketone with an excess of mesityl oxide in tetrahydrofuran solution in the presence of potassium hydroxide as catalyst. The tetrahydrofuran solvent need not be completely anhydrous. However, better yields are realized if the solvent is first dried, e.g., over calcium hydride or by other suitable means.

The order of addition of reactants is somewhat critical. By reason of the tendency of methyl vinyl ketone to undergo rapid polymerization in the presence of a base, the methyl vinyl ketone should not be mixed with the potassium hydroxide catalyst in the absence of mesityl oxide. The mesityl oxide, which condenses with itself under the influence of a base at a much slower rate, can be mixed directly with the catalyst. The preferred method comprises the gradual addition of the methyl vinyl ketone to a mixture of the catalyst and mesityl oxide in tetrahydrofuran. Alternatively, a solution of methyl vinyl ketone in mesityl oxide is added to a mixture of potassium hydroxide and mesityl oxide in tetrahydrofuran. In this alternative method, the major portion of the mesityl oxide is desirably admixed with the catalyst in tetrahydrofuran.

For optimum yields of piperitenone an excess of mesityl oxide is necessary. Molar ratios of mesityl oxide to methyl vinyl ketone of from about 3 to 1 to about 10 to 1 have been found to be productive of satisfactory yields of piperitenone. Molar ratios greater than 10 to 1 can, of course, be used but afford no advantages. The upper ratio of mesityl oxide to methyl vinyl ketone appears to be fixed only by economic considerations and the size of available equipment. The lower molar ratio is rather critical. Ratios of less than about 3:1 produce greater proportions of by-products and lesser amounts of piperitenone. The preferred range of molar ratios is from about 4 to 1 to about 7 to 1.

Reaction temperature does not appear to be critical in the present process. Temperatures of from as low as 0° C. to the reflux temperature of the tetrahydrofuran solvent may be employed. The reaction, when conducted according to the preferred method of this invention, which comprises the gradual addition of methyl vinyl ketone to a mixture of the catalyst and mesityl oxide in tetrahydrofuran, is started at a temperature of from about 0° C. to about 30° C. Higher temperatures can be used during the addition phase but afford no advantages and frequently result in reduced yields of piperitenone. Upon completion of the addition phase of the reaction, the temperature is increased to the reflux temperature. Lower temperatures are operative for this phase of the reaction but are not desirable since, in order to obtain satisfactory yields, prolonged reaction times are generally required. When using the alternative method of addition mentioned above, the same temperature considerations apply.

The amount of potassium hydroxide catalyst used is not critical. However, it has been found convenient to use a molar ratio of methyl vinyl ketone to potassium hydroxide of from about 10 to 1 to about 10 to 5. Lower or higher ratios can be used but appear to offer no advantage.

The time required for the reaction may vary considerably depending upon the conditions, particularly temperature, used. Time periods ranging from about 30 minutes to 2 days give substantial amounts of the desired piperitenone. Under the preferred or alternative reaction conditions mentioned above the overall reaction period is from about 2 hours to about 6 hours. The progress of the reaction may be conveniently followed by gas chromatographic techniques using the known adsorbent systems. A carbowax column is especially useful.

The present condensation process possesses a number of unique advantages which make it particularly suitable for large scale, i.e. industrial production. For example, the yields of piperitenone are upwards of 50 to 60%. Obviously, the unused reactants may be recovered, in part at least, and reutilized in the present process. A further advantage of the present process lies in the fact that there are no appreciable quantities of by-products which normally might be expected in condensation processes of this type. This certainly is evident by the high yields obtained. The absence of substantial amounts of by-products permits recovery and purification of the piperitenone by careful fractional distillation or, more conveniently, by distillation to give a crude piperitenone followed by purification of the crude product via its water soluble bisulfite adduct. The bisulfite adduct is decomposed by treatment with a suitable base, e.g., sodium or potassium hydroxide, sodium carbonate, or acid, e.g., hydrochloric, sulfuric or nitric acid, in aqueous solution according to known procedures. The thus regenerated piperitenone is extracted with a suitable water immiscible solvent, e.g., one in which the piperitenone is at least moderately soluble, such as ether, pentane, benzene, n-butanol, and recovered therefrom by evaporation of the solvent.

This method of purification involves, in general, reaction of the piperitenone with an excess of sodium bisulfite in aqueous solution. The use of an excess of bisulfite is desirable in order to permit complete conversion of the piperitenone to its bisulfite adduct. The actual excess of bisulfite used is not critical and is determined primarily by economic considerations particularly in view of the subsequent extraction and decomposition steps. From a practical standpoint about a 10–20% excess of bisulfite is favored. While temperatures of from about 5° C.–100° C. can be used it is advantageous to conduct the reaction at a temperature of from about 50° C. to 90° C. A temperature of about 80° C.–90° C. is preferred. The suspension is thoroughly stirred and the pH thereof adjusted to about 7.0–10.0 by gradual addition of an acid, e.g. acetic acid or a mineral acid. The mixture is then cooled and extracted with ether, pentane, benzene, n-butanol or other water immiscible solvent to remove by-products. The aqueous phase is then treated with a suitable base or acid as noted above to regenerate the piperitenone and extracted with a water immiscible solvent such as ether, pentane, benzene, n-butanol. Removal of the solvent, after drying, gives pure piperitenone.

Base decomposition of the bisulfite adduct is desirably accomplished at a pH above 10 and preferably at about pH 12 to ensure complete and rapid decomposition. Acid decomposition is conducted at pH 5 or lower. The pH range of about 2 to 4 is favored for acid decomposition.

Alternatively, the bisulfite adduct salt is precipitated from the aqueous solution by the addition of a sufficiently large excess of bisulfite or by addition of a water miscible solvent to the aqueous bisulfite adduct solution which desirably contains excess bisulfite. The salt thus obtained is decomposed by treatment with an aqueous solution of a base or acid as described above.

The following examples are given by way of illustration and are not to be construed as limitations of this invention, many variations of which are possible without departing from the scope and spirit thereof.

*Example I*

In a 5 l. 3-neck round bottom flask equipped with a stirrer, thermometer and dropping funnel is placed 1 liter of tetrahydrofuran (dried over calcium hydride) and finely ground potassium hydroxide (40 g.; 0.73 mole). With stirring and slight cooling, 1700 ml. of mesityl oxide is added. A solution of 177.5 g. (2.5 moles) of methyl vinyl ketone in 200 ml. of mesityl oxide (total 9 moles) is added dropwise over 45 minutes with sufficient cooling to keep the temperature between 20°–30° C. The reaction is stirred and refluxed for 30 minutes. Glacial acetic acid (42.5 ml.) is then added and the solvent and mesityl oxide removed by distillation (2.4 l.). The residue is filtered and the cake washed with 100 ml. of ether. The filtrate (plus wash solution) is distilled in vacuo and the fraction B.P. 90–125° C. at 10 mm. collected (340 g.).

The crude piperitenone thus obtained is added to a stirred solution of 560 g. of sodium bisulfite and 2 liters of water at 80°–90° C. The suspension is stirred and acetic acid (200 ml.) added dropwise to maintain a pH of about 8.0–9.0. When the pH of the reaction mixture no longer changes the mixture is cooled to room temperature and extracted 3 times with 250 ml. of ether. Evaporation of the ether gives 88 g. of crude oil which, by gas chromatography on a carbowax column, is found to contain very little piperitenone. The aqueous layer is cooled in an ice bath and the pH adjusted to 12.0 with 50% sodium hydroxide. The suspension is stirred for 10 minutes and then extracted 4 times with 300 ml. of ether. The ether is dried over anhydrous sodium sulfate and evaporated to give 154 g. (41%) of piperitenone that showed essentially a single peak on assay by gas chromatography.

$\lambda_{max.}^{EtOH}$ 243, 277 m$\mu$ (E277=7760)

*Example II*

A solution of 35 g. (0.5 mole) of methyl vinyl ketone in 229 ml. (2.0 moles) of mesityl oxide is added dropwise to 8.4 g (0.15 mole) of finely ground potassium hydroxide in 200 ml. of dry tetrahydrofuran. The reaction mixture is maintained at 0° C. throughout the addition and stirred rapidly. Following completion of addition, the mixture is stirred for one hour then heated to reflux for 30 minutes. Glacial acetic acid (8.6 ml.) is then added, the tetrahydrofuran and excess mesityl oxide removed by distillation and the residue filtered. The filter cake is washed with 20 ml. ether and the ether evaporated from the combined filtrate plus ether wash. Crude piperitenone is obtained by vacuum distillation of the filtrate.

The product is purified according to the procedure of Example I but using one-fifth the quantities of chemicals. Yield=36%.

*Example III*

To a stirred mixture of 229 ml. (2.0 moles) of mesityl oxide, 200 ml. of tetrahydrofuran and 8.4 g. (0.15 mole) of finely ground potassium hydroxide at 0° C., there is added dropwise over a 30 minute period 35 g. (0.5 mole) of methyl vinyl ketone. The reaction mixture is held at 0° C. during addition and for one hour thereafter then heated to reflux for 30 minutes. The mixture is worked up according to the procedure of Example II to give a 40% yield of piperitenone.

*Example IV*

The procedure of Example III is repeated but using the following quantities of reactants. (MVK=methyl vinyl ketone, THF=tetrahydrofuran)

| MVK, M | Oxide, M | KOH, M | THF, ml. | T. ° C. | Percent Yield Piperitenone |
|---|---|---|---|---|---|
| 0.5 | 2.0 | 0.15 | 200 | 0–65 | 45 |
| 2.5 | 10.0 | 0.7 | 1,000 | 0–65 | 48 |
| 0.5 | 1.5 | 0.10 | 200 | 0–65 | 34 |
| 0.5 | 5.0 | 0.15 | 200 | 0–65 | 46 |
| 0.5 | 2.0 | 0.25 | 200 | 0–65 | 37 |
| 0.5 | 2.0 | 0.4 | 200 | 0–65 | 35 |

Example V

The procedure of Example III is repeated on a somewhat larger scale. The methyl vinyl ketone is added over a one hour period at 25° C. rather than over a 30 minute period at 0° C. The reaction mixture is stirred for one hour at 25° C. following addition. Pertinent data are recorded below:

| MVK, M | Mesityl Oxide, M | KOH, M | THF, ml. | T° C. | Percent Yield Piperitenone |
|---|---|---|---|---|---|
| 2.5 | 17 | 0.7 | 1,000 | 25-65 | 59 |
| 2.5 | 10 | 0.7 | 1,000 | 25-65 | 46 |
| 2.5 | 17 | 0.7 | 1,000 | 25-65 | 64 |
| 2.5 | 10 | 0.7 | 1,000 | 25-65 | 42 |
| 2.5 | 7.5 | 0.6 | 1,000 | 25-65 | 41 |
| 2.5 | 10 | 0.25 | 1,000 | 25-65 | 38 |
| 0.5 | 2.0 | 0.4 | 200 | 25-65 | 49 |
| 2.5 | 2.0 | 0.15 | 200 | 25-65 | 55 |

Example VI

The procedure of Example I is repeated and the crude piperitenone obtained by distillation divided into 5 equal parts of 68 g. each. Each portion is purified by means of sodium bisulfite under the following conditions. One-fifth of the quantities of materials used in Example I are used.

| Temperature of Bisulfite Reaction | Adjusted to pH 8-9 by— | Bisulfite Adduct Decomposed by— |
|---|---|---|
| 5-15° C | Acetic acid | NaOH, pH 12.0. |
| 20-30° C | Hydrochloric acid (6 N) | KOH, pH 12.0. |
| 50-60° C | Acetic acid | NaOH, pH 12.0. |
| 70-80° C | Sulfuric acid (6 N) | NaOH, pH 12.0. |
| 90-100° C | Nitric acid (6 N) | KOH, pH 12.0. |

In each instance the yield of piperitenone is at least 40%. At temperatures below 50° C., a considerably longer period of time is required for the bisulfite reaction to take place and a longer period is necessary to effect the adjustment to pH 8-9.

Each of the purified portions gives essentially a single peak on assay by gas chromatography.

Example VII

Crude piperitenone, prepared according to the procedure of Example I, was purified via the sodium bisulfite adduct under the following conditions. 50 g. of crude is used in each instance.

| Temperature of Bisulfite Reaction | Adjusted to pH by Acid | Bisulfite Adduct Decomposed by— |
|---|---|---|
| 5-10° C | 8-9, acetic | HCl, pH 4.0. |
| 50-60° C | 7-8, acetic | HCl, pH 2.0. |
| 80-90° C | 9-10, sulfuric (6 N) | HCl, pH 5.0. |
| 80-90° C | 8-9, sulfuric (6 N) | Na₂CO₃, pH 11.0. |
| 80-90° C | 8-9, acetic | KOH, pH 13.0. |
| 80-90° C | 9-10, hydrochloric (6 N) | HCl, pH 1.0. |

The yield of piperitenone is 40% or better in each case and of comparable purity to the product of Example I.

What is claimed is:

1. In the process of manufacture of piperitenone by the condensation of mesityl oxide and methyl vinyl ketone in the presence of a basic catalyst, the improvements which comprise first admixing mesityl oxide and potassium hydroxide catalyst in tetrahydrofuran, then adding methyl vinyl ketone and effecting the condensation at a temperature of from about 0° to about 65° C., using a molar ratio of from about 3 to about 10 parts of mesityl oxide per part of methyl vinyl ketone.

2. In the process of manufacture of piperitenone by the condensation of mesityl oxide and methyl vinyl ketone in the presence of a basic catalyst, the improvements which comprise first admixing a major portion of the mesityl oxide and potassium hydroxide catalyst in tetrahydrofuran, then adding the methyl vinyl ketone in a minor portion of the mestiyl oxide and effecting the condensation at a temperature of from about 0° to about 65° C., using a molar ratio of from about 3 to about 10 parts of mesityl oxide per part of methyl vinyl ketone.

3. The process of claim 1 wherein the molar ratio of methyl vinyl ketone to potassium hydroxide is from about 10:1 to about 10:5.

4. The process of claim 1 wherein the molar ratio of mestiyl oxide to methyl vinyl ketone is from about 4:1 to about 7:1.

5. The process of claim 4 wherein the temperature range is from about 25° C. to about 65° C.

6. A process for the purification of piperitenone prepared by the process of claim 1, which comprises reacting piperitenone in an aqueous solution with an excess of sodium bisulfite at a temperature of from about 5° C. to about 100° C. to form the bisulfite adduct, adjusting said aqueous solution to a pH of from 7.0 to about 10.0, extracting said aqueous solution with a water immiscible solvent, thereafter decomposing said adduct in said aqueous solution by adjusting the pH to below about 5 or above about 10, thereby regenerating piperitenone, extracting said piperitenone with a water immiscible solvent and recovering purified piperitenone therefrom.

References Cited by the Examiner

UNITED STATES PATENTS 2,544,562   6/1951   Michael _____ 260—593

OTHER REFERENCES

Adams et al., "Organic Reactions," vol. 10, pp. 187 and 264-66 (1959).

Lawesson et al., "Acta. Chem. Scand.," vol. 13, pp. 1717-18 (1959).

Misrock et al., "Ind. and Eng. Chem.," vol. 49, No. 5, pp. 822-4 (1957).

LEON ZITVER, *Primary Examiner.*

LORRAINE A. WEINBERGER, *Examiner.*

M. JACOB, *Assistant Examiner.*